United States Patent

[11] 3,629,639

[72] Inventors: Bill M. McClure, Pine Bluff; John J. Berky, Little Rock, both of Ark.; George R. Savage, Kansas City, Mo.
[21] Appl. No.: 841,716
[22] Filed: July 15, 1969
[45] Patented: Dec. 21, 1971
[73] Assignee: The United States of America as represented by the Secretary of the Army

[54] MEASURING INSTRUMENT
9 Claims, 6 Drawing Figs.

[52] U.S. Cl. .................................................. 33/143
[51] Int. Cl. ................................................. G01b 5/00
[50] Field of Search .................................... 33/143 B; 350/170, 171

[56] References Cited
UNITED STATES PATENTS

| | | | |
|---|---|---|---|
| 2,731,725 | 1/1956 | Stefacek | 33/143 |
| 2,840,915 | 5/1958 | Drummond | 33/143 |
| 2,906,025 | 9/1959 | Drummond | 33/143 |
| 2,973,580 | 3/1961 | Brown | 33/143 |

Primary Examiner—Leonard Forman
Assistant Examiner—A. J. Mirabito
Attorneys—Harry M. Saragovitz, Edward J. Kelly, Herbert Berl and S. Dubroff ABSTRACT: A gel-diffusion precipitate band reader used to measure the length of precipitate zones or bands in which a gel tube is retained in a slotted holder by a spring clip in alignment with a viewing lens, a movable hairline structure operated by a micrometer, and an adjustable structure containing a pair of fixed hairlines. A viewing lens is located in front of the arrangement and rearwardly of the holder a fluorescent tube is mounted adjacent a backdrop carried by the movable hairline structure.

INVENTORS
BILL M. McCLURE
JOHN J. BERKY
BY GEORGE R. SAVAGE
ATTORNEYS

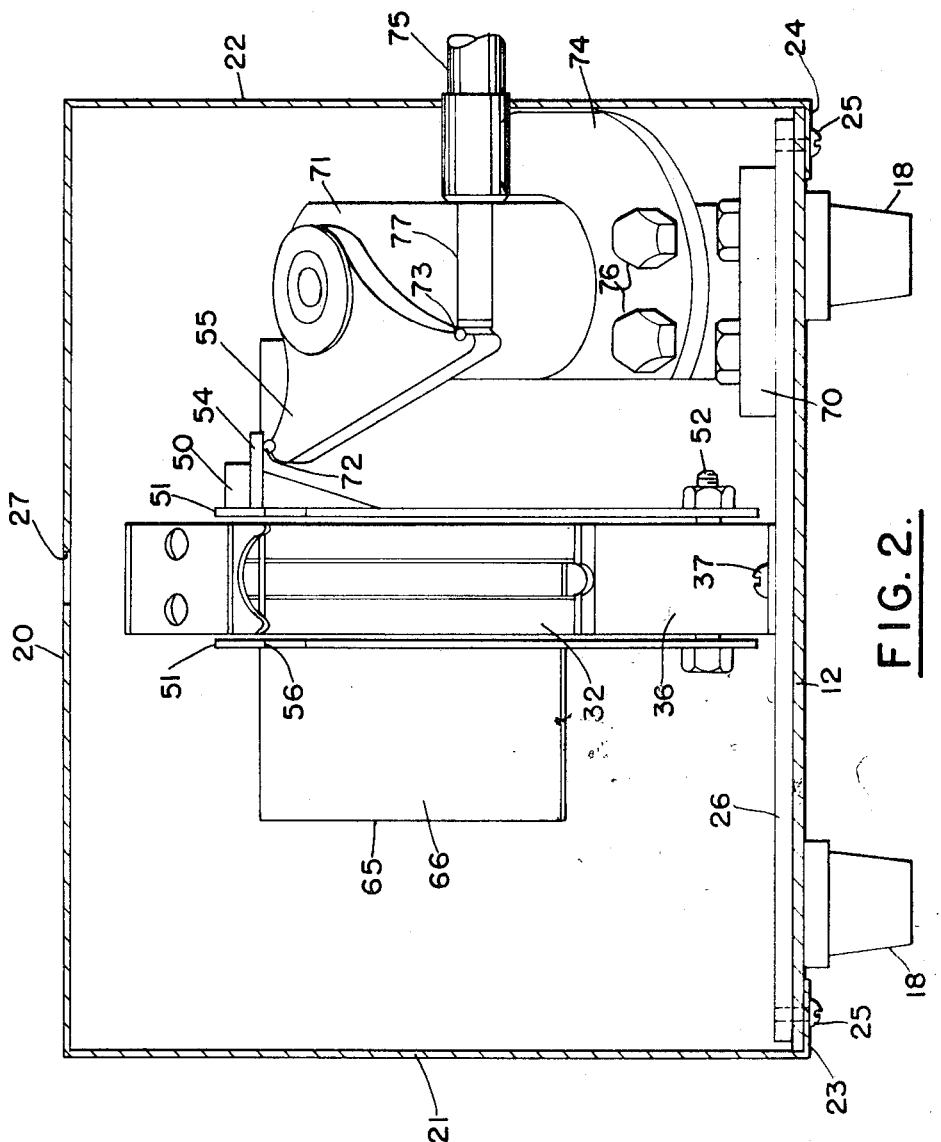

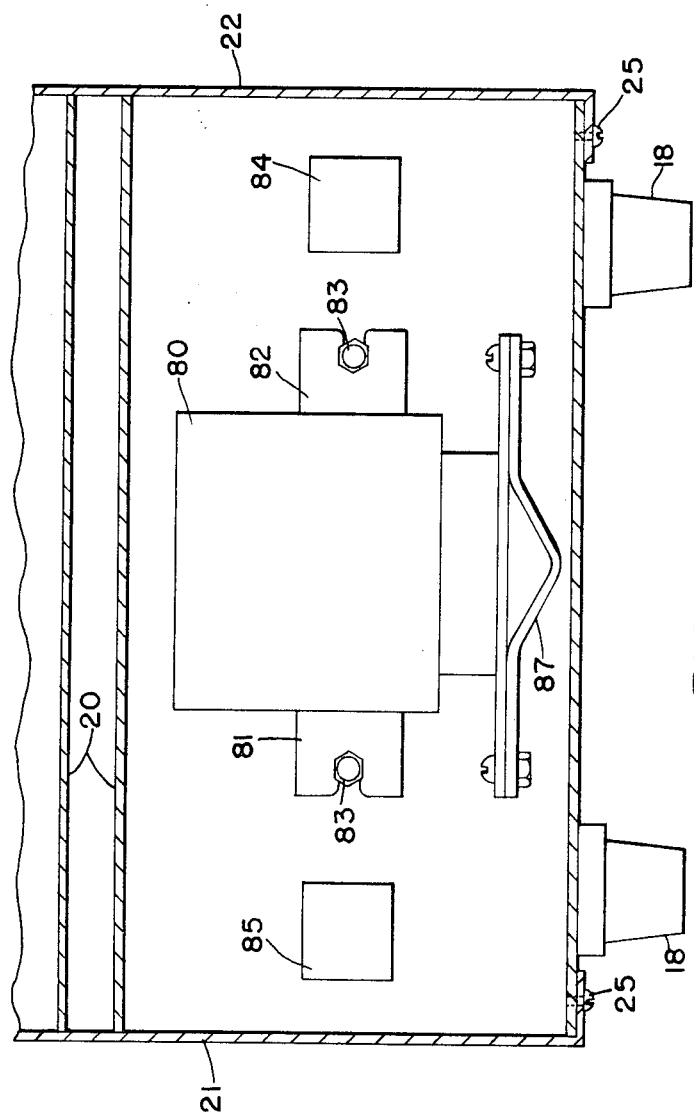

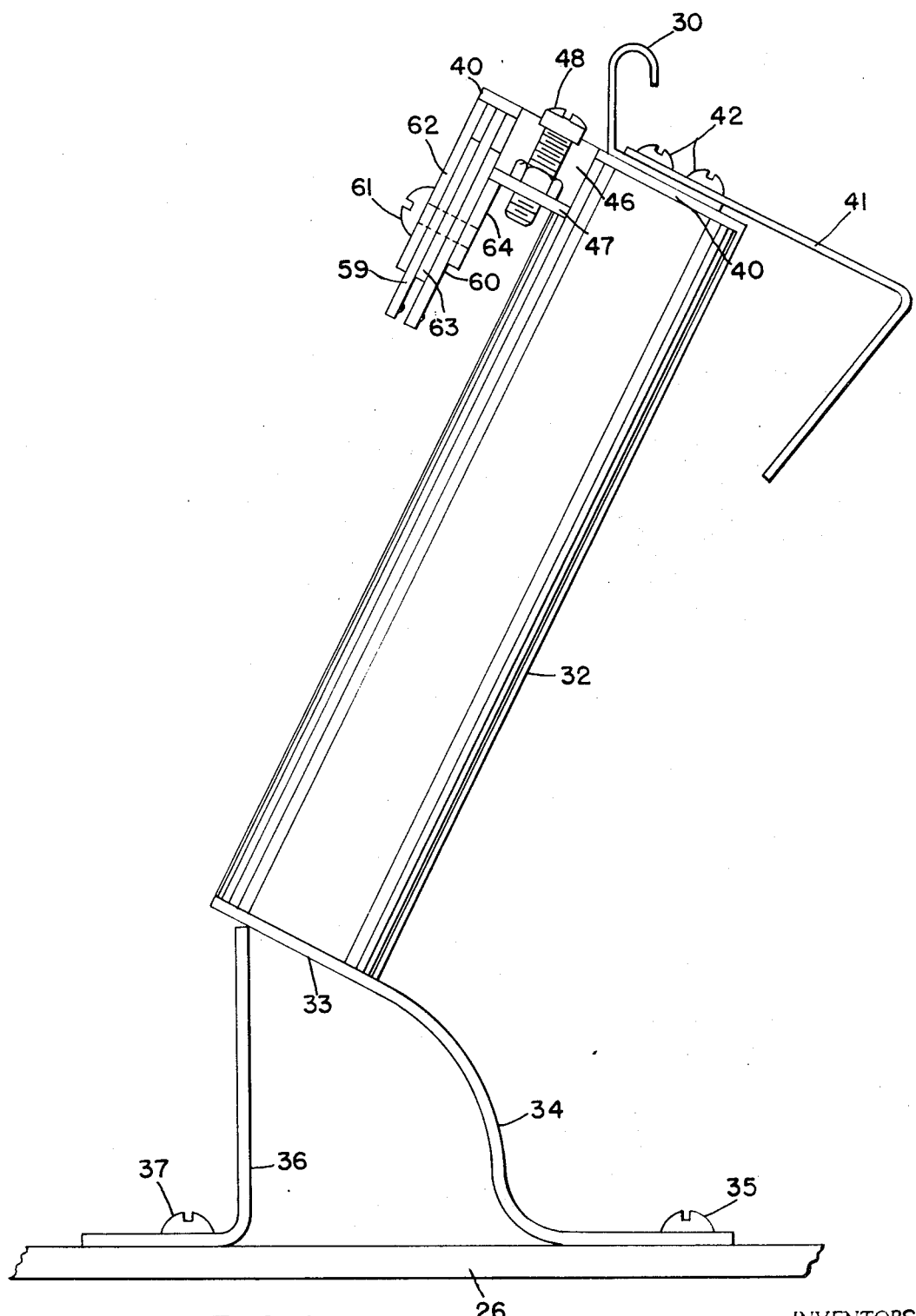

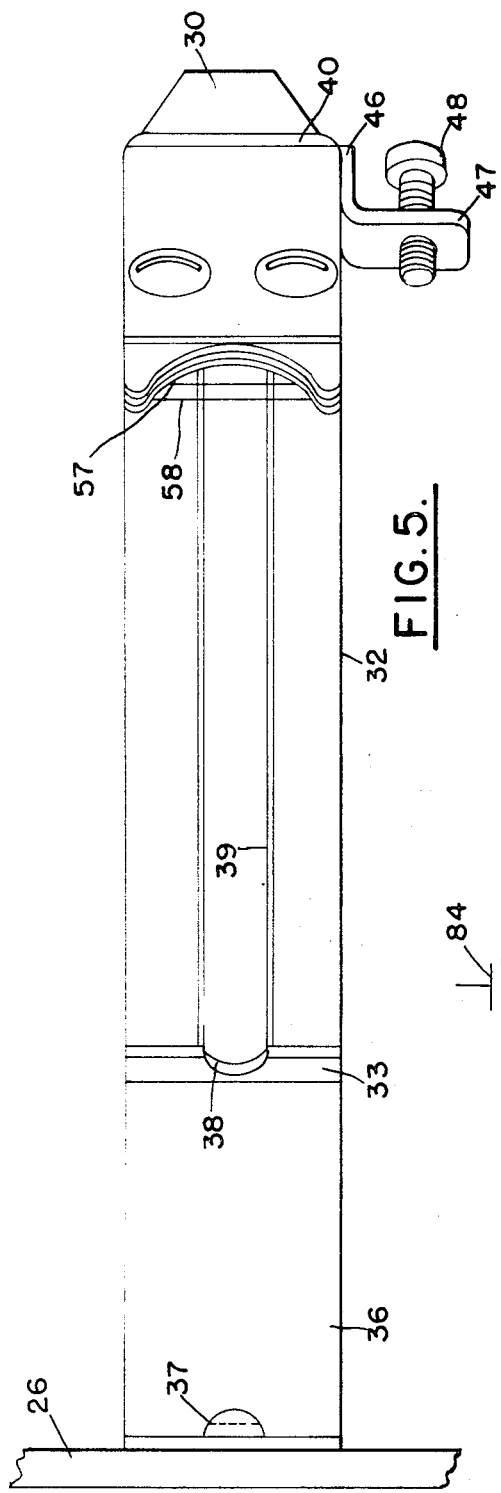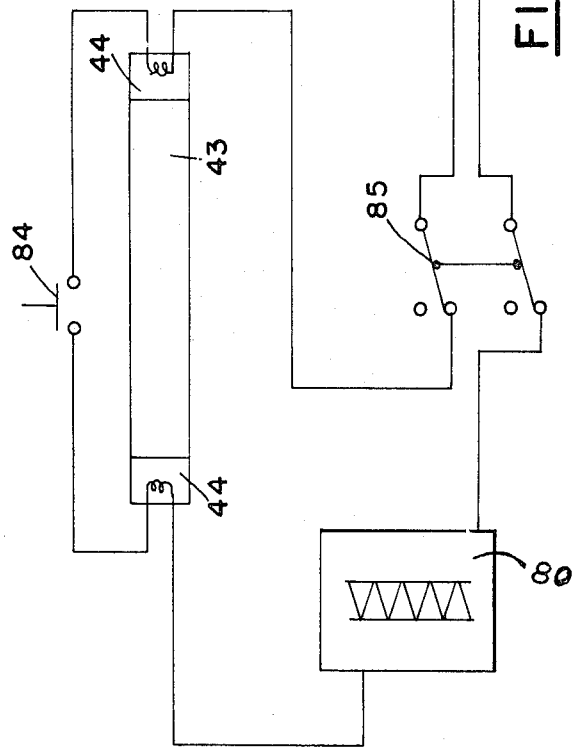

MEASURING INSTRUMENT

The invention described herein may be manufactured, used, and licensed by or for The Government for governmental purposes without the payment to us of any royalty thereon.

The invention relates to measuring instruments and, more particularly to a gel-diffusion optical band reader.

One of the objects of the invention is to provide an accurate instrument employed to measure the length of precipitate zones or bands resulting from a serological reaction such as a precipitin reaction between antigen and antibody.

Another object of the invention is to provide such an instrument which enables the elimination of parallax.

These and other objects, advantages and features will become more apparent from the following description and accompanying drawings in which:

FIG. 2 is a similar front elevational view of the FIG. 1 arrangement.

FIG. 3 is a sectional view taken substantially along line 3—3 of FIG. 1.

FIG. 4 is an enlarged side elevational view partially in section of a portion of the FIG. 1 arrangement.

FIG. 5 is an enlarged front elevational view partially in section of the FIG. 4 structure.

FIG. 6 is a schematic view of a preferred wiring diagram associated with the FIG. 1 arrangement.

Figure 1:
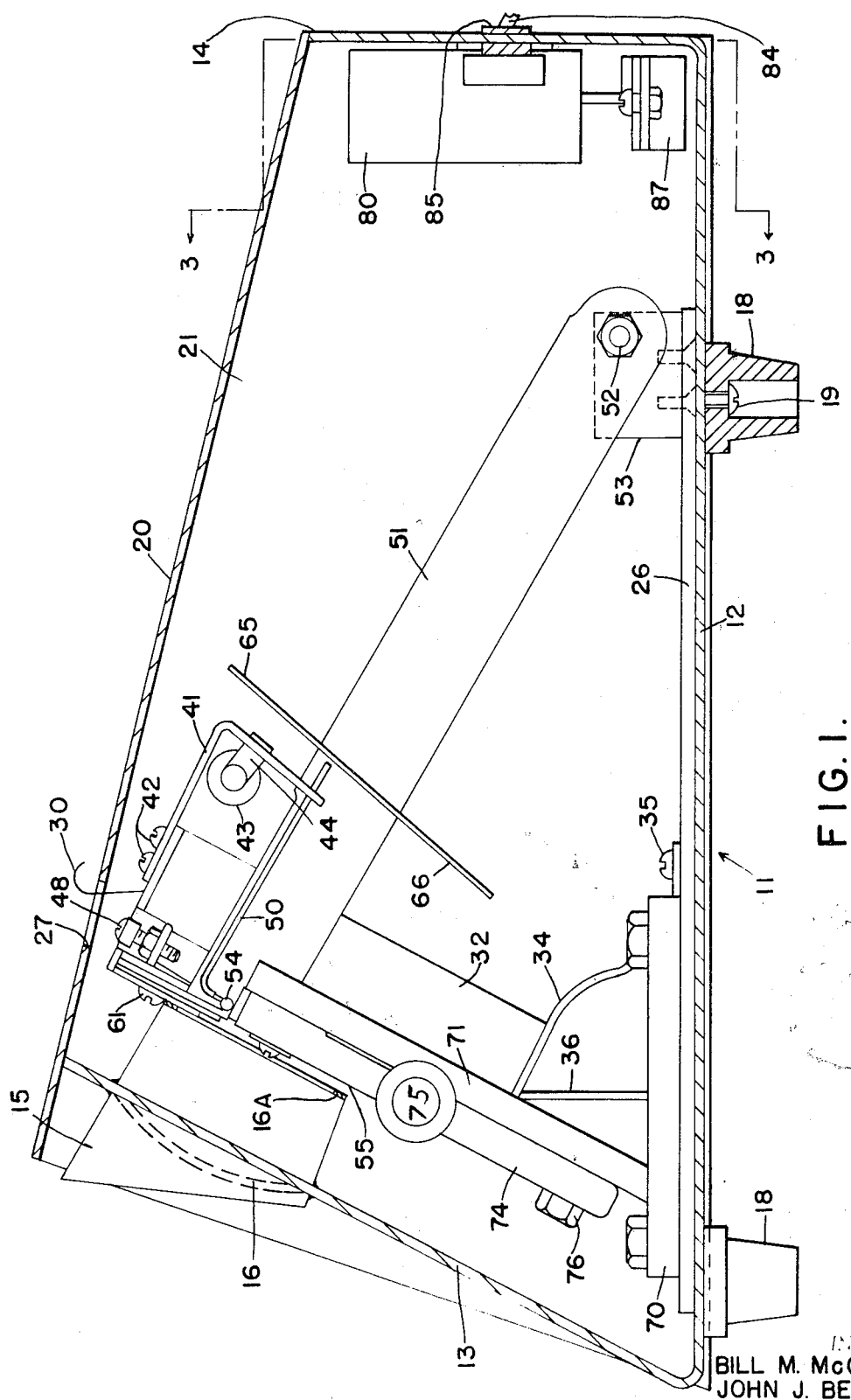
FIG. 1 is a side elevational view partially in section and with certain parts removed of a preferred gel-diffusion optical band reader embodying the principles of the invention.

The gel-diffusion band reader shown generally at 11 (FIG. 1) is a unit housed in a stainless steel case. The lower housing includes a base portion 12 having integral front and rear walls 13, 14. Front wall 13 is constructed to slope rearwardly and form an angle of approximately 63° to 65° with the base 12, and is suitably apertured to receive a viewing lens device 15, which is secured by epoxy to the ported front wall 13, containing lens 16 and a suitably slotted rear wall 16A.

The base portion 12 preferably has four appropriate rubber feet 18 secured to its undersurface by respective screws 19. A U-shaped cover member 20 has its sidewalls 21, 22 provided with suitably apertured bottom flanges 23, 24 that receive screws 25 (FIGS. 2,3) by which both the cover 20 and the lower housing base 12 are secured to each other as well as the base plate 26. The cover top has an appropriate T-shaped opening 27 located along its longitudinal forward centerline to receive both spring clip 30 and a specimen containing gel tube or workpiece tensionally held thereby in its slotted tube holder 32 (FIGS. 1, 2, 4, 5). Holder 32 has a bottom portion 33 (FIG. 4, 5) suitably secured thereto and the extended rearward portion of the latter is bent or formed as a bracket member 34 which is appropriately secured by screws 35 to the base 26. An upright forward bracket portion 36, also secured to base plate 26 by screws 37, is secured by silver solder to the holder bottom 33 rearwardly adjacent a predetermined arcuate slot 38 (FIG. 5) formed in its forwardmost edge. The stainless steel holder 32 extends substantially parallel to front wall 13 and its wall surfaces, including those defined by its longitudinally extending slot 39, are all painted with a dull black color.

The upper portion 40 of gel tube holder 32 has the spring clip 30 and a fluorescent tube bracket 41 (FIGS. 1, 4) secured thereto by screws 42. Fluorescent tube lamp 43 (FIG. 1) has its holders 44 suitably secured to bracket 41. The holder upper portion 40 has an appropriate opening (not shown) forwardly adjacent spring clip 30 to accommodate the gel tube, and secured to it by silver solder is an L-shaped bracket 46 (FIGS. 4,5) whose arm 47 is threadedly apertured to receive and support an adjustable stop screw 48 and its locking nut.

Abutment screw 48 lies in the operative path of an L-shaped arm 50 that is secured by silver solder to one of the bifurcated arms 51 of a U-shaped pivoted lever structure journaled at 52 to its base plate secured support block 53. A transversely extending pin 54 (FIGS. 1, 2) is secured to the one arm 51 in abutting relationship with the lower edge of arm 50 whose forward surface is painted black. Pin 54 functions as a cam follower resting upon a micrometer actuated bell crank 55 (FIG. 2) through which the movable hairline 56, secured by epoxy across the arms 51, 51 rearwardly adjacent preset fixed hairlines 57, 58, is adjusted substantially along chord positions relative to journal pin 52. Fixed hairlines 57, 58 (FIG. 5) are secured by epoxy across respective recessed end portions of double slotted members 59, 60 (FIG. 4) that are secured by screw 61 in adjusted positions relative to apertured plates 62, 63 and tapped plate member 64 which is secured by silver solder to bracket arm 47. An appropriately slotted backdrop member 65 (FIGS. 1, 2) is secured by silver solder to the bifurcated lever arms 51, 51 and has its front or forward surface painted black prior to being covered with black velvet material 66 upon assembly.

An inclined or angular support has a base portion 7 (FIGS. 1,2) suitably secured to base plate 26 and the inclined leg portion 71 is secured thereto by silver solder adjacent the leg beveled lower end. To the upper end of leg 71 is pivotally mounted the freely movable bell crank 55 having a pair of cam elements 72, 73 (FIG. 2) formed each with a carbide rod brazed in a predetermined location along the corresponding bell crank arcuate sidewalls. The bracket portion 74 of micrometer 75 (shown partially in FIG. 2) is secured by suitable bolt means 76 to a lower portion of leg 71 which extends substantially parallel to gel tube holder 32 and front wall 13. The carbide rod 73, by virtue of gravitational effect upon the bell crank 55 and associated parts will normally be biased against the free end of the movable micrometer stem 77 and the normal indicia means, extending through an appropriate opening in housing sidewall 22, provides available readings for relative micrometer stem or movable hairline positions.

A fluorescent light ballast 80 (FIGS. 1, 3, 6) has appropriate bracket arms 81, 82 suitably secured by screw means 83 to the housing rear wall 14 to which also are suitably secured a pushbutton switch 84 and a double pole single throw switch 85. An appropriate bracket structure 87 (FIGS. 1, 3) depends from the ballast structure and facilitatingly supports the necessary wires inside the housing. As an optional feature, a twist lock plug 89 (FIG. 6) may be employed in the wiring or electrical circuit to secure the electrical circuit against moisture and to prevent accidental detachment during operation.

When a specimen containing gel tube is secured in the holder 32 and the two fixed hairlines 57, 58 have been preset or positioned in the reader such that, with proper visual alignment by an operator, only one hairline image is seen, the micrometer is set at zero when the movable hairline 56 coincides with the fixed hairlines. The gel tube is located so that the meniscus of the agar gel is zeroed at or aligned with the fixed hairlines. As the micrometer is unscrewed for adjusting the movable hairline to coincide or align with the precipitate band front, the length of the band may be observed from the micrometer.

The 4-watt fluorescent tube 43, mounted rearwardly adjacent the test tube, admits light through the holder slot and serves to illuminate the test tube and contents along with the hairlines.

We wish it to be understood that we do not desire to be limited to the exact details of construction shown and described, for obvious modifications will occur to a person skilled in the art.

We claim:

1. In a gel-diffusion optical band reader having a steel housing including a base portion and longitudinally spaced front and rear walls integral with said base,
  a viewing lens secured in a port located in said front wall,
    means within said housing connected to said base portion and supporting a micrometer, a pivotally mounted bell crank within said housing moved by said micrometer, a member, within said housing responsive to movement of said bell crank, carrying a horizontally disposed hairline and movable transversely of the axis of both said hairline and a horizontally extending fixed hairline,
  a holder for a gel tube disposed adjacent both of said hairlines, said gel tube being adjustably positionable in said gel tube holder relative to said fixed hairline, and means secured to said base portion mounting said holder within said housing substantially parallel to said front wall, so constructed and arranged that the length of a precipitate band in said gel tube may be indicated by said micrometer upon predetermined adjustment of said movable hairline member.

2. The structure in accordance with claim 1 wherein said holder has a longitudinally extending wall portion substantially parallel to said front wall, a slot in said holder wall centrally aligned with said lens and said fixed hairline, a black velvet covered backdrop member mounted for movement with said movable hairline member, and a fluorescent tube positioned intermediate said holder and said backdrop member.

3. The structure of claim 2 in which a pushbutton switch and a fluorescent light ballast are mounted on said rear wall and in an electrical circuit with said fluorescent tube.

4. The structure of claim 2 wherein a spring clip is mounted on said holder and extends through an opening in a cover of said housing for positioning said gel tube.

5. The structure of claim 2 in which said support means includes an inclined leg extending substantially parallel to said front wall, said bell crank being pivotally connected to said inclined leg and in operative alignment with said micrometer and said movable hairline member.

6. The structure of claim 5 wherein said movable hairline member includes a bifurcated lever having a pair of elongated arms pivotally mounted on a transversely extending journal pin, said first mentioned hairline extending across the free end portions of said lever arms, and a pin secured to one of said lever arm and having a surface portion substantially in transverse alignment with said first hairline and operatively aligned with a carbide rod brazed to said bell crank.

7. The structure of claim 6 in which said bell crank has a second carbide rod brazed thereto and normally biased against a movable stem of said micrometer.

8. The structure of claim 1 wherein said micrometer extends through and externally of an apertured sidewall of said reader housing.

9. The structure of claim 8 in which a plurality of rubber feet are secured to said base portion.

* * * * *